No. 789,176.                                                    Patented May 9, 1905.

UNITED STATES PATENT OFFICE.

FREDERIC J. SMITH, OF ELIZABETH, NEW JERSEY, ASSIGNOR TO AMERICAN AGRICULTURAL CHEMICAL COMPANY, OF NEW YORK, N. Y.

INSECTICIDE AND METHOD OF DEHYDRATING MOIST MATERIALS.

SPECIFICATION forming part of Letters Patent No. 789,176, dated May 9, 1905.

Application filed February 26, 1903. Serial No. 145,299.

*To all whom it may concern:*

Be it known that I, FREDERIC J. SMITH, of Elizabeth, in the county of Union, and in the State of New Jersey, have invented a certain new and useful Improvement in Insecticides and Methods of Dehydrating Moist Materials; and I do hereby declare that the following is a full, clear, and exact description thereof.

The object of my invention has been to provide a method of dehydrating moist products, so that they can be shipped or stored and can be maintained in their original condition and proportions without the provision of special packing or storing vessels.

The obje of my invention has also been to produce a insecticide by the said method which shall have the above-stated qualities; and to such ends my invention consists in the method of dehydrating moist materials and in the insecticide hereinafter specified.

My invention in its first part relates to a method of dehydrating manufactured materials by changing the water which exists in such materials as free water or moisture into the water of combination or crystallization, where for any reason it is desired to render the said materials dry, and especially where it would be injurious or undesirable to the said materials to dry the same by artificial heat or to allow the moisture to escape by evaporation. To accomplish this desirable result, I mix with the materials to be treated a substance which will take up the water, as in the form of water of crystallization or combination, and such substance is preferably such as is inert to the materials being treated and such as by its presence will in no way interfere with the practical use or application of the material being treated. I have found that for this purpose the most desirable substances are those salts which combine with water in the process of crystallization. This method of dehydration is particularly applicable to those materials which have been precipitated from solutions and subsequently filtered, as with presses, and which, therefore, form a wet paste. When it is necessary to use or apply such materials with water, the salts used for dehydration should be soluble in water, and other conditions being fulfilled those salts which combine with the largest amount of water, as water of crystallization, are the most desirable for this method of dehydration.

As a specific instance of the use of my method and as one which I have found to be most desirable, I have chosen for illustration its application to arsenate of lead, which has been found to be a most valuable insecticide and which has heretofore been shipped as a paste from the manufacturer to the consumer, the arsenate of lead having been precipitated from solutions of soluble lead salts with arsenate of soda and then passed through filter-presses. This results in a press-cake which is wet and which is now shipped in its wet form in water-tight packages, the paste containing from forty-five to fifty per cent. of water. The paste could not be dried without injuring the arsenate of lead, and in shipping it as a paste the water evaporates, so that its strength by the time it reaches the consumer has changed from that at which it was sold by the manufacturer. In applying my invention to the dehydration of this paste I prefer to use sulfate of soda, popularly known as "Glauber salt," having the formula

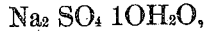

$$Na_2SO_4 \, 10H_2O,$$

which salt crystallizes under ordinary conditions with ten molecules of water. I first remove the water of crystallization from the sulfate of soda, as by heating the salt to the temperature of 100° centigrade, when the water of crystallization is driven off. The remaining salt is then preferably reduced to a powder and is mixed with the arsenate-of-lead paste in the proportion of ten parts of dehydrated sulfate of soda to twenty-five parts of the paste, although these proportions may vary, according to the amount of water in the paste, the best result being obtained by adding sufficient dehydrated sulfate of soda to form with all of the water in the paste the crystallized salt $Na_2SO_4 10H_2O$. The crystallized salt $Na_2SO_4 10H_2O$ melts at about 33° centigrade, and I have found the best result to be obtained in mixing the dehydrated sulfate of soda with the arsenate-of-lead paste by raising the temperature of the mass during the process of mixing to about 35° centigrade. After a thorough mixture is obtained the mass is put aside to cool, when a setting process takes place and the product solidifies. The substance may then be pulverized or comminuted to any desirable size, and in this form may be put into any package suitable for dry powders.

When it is desired to use the arsenate of lead as an insecticide, the powder is mixed with water, and the sulfate of soda dissolves, leaving the particles of arsenate of lead suspended in the water in a desirable form for spraying, the particles being sufficiently small and uniform so that they can be carried by the water and do not accumulate at the bottom of the tank of a spraying-machine.

Having thus described my invention, what I claim is—

1. The process of dehydrating a paste containing water and a material insoluble therein, which consists in mixing with said paste, in quantity sufficient to dehydrate the same, an anhydrous salt capable of uniting with water but inert toward said insoluble material.

2. The process of dehydrating a paste containing water and lead arsenate, which consists in mixing with said paste an anhydrous salt capable of uniting with water but inert toward lead arsenate.

3. The process of dehydrating a paste containing water and lead arsenate, which consists in mixing with said paste anhydrous sodium sulfate.

4. The process of dehydrating a paste containing water and a material insoluble therein, which consists in mixing with said paste an anhydrous salt capable of uniting with water, and maintaining the mass during mixing at a temperature above the melting-point of the hydrated salt.

5. The process which consists in mixing a paste containing arsenate of lead and water with anhydrous sodium sulfate, thereby forming a pulverizable mixture of lead arsenate with hydrated sodium sulfate, and maintaining the mass during mixing at a temperature above the melting-point of hydrated sodium sulfate.

6. An improved insecticide, containing a mixture of lead arsenate and a hydrated salt.

7. An improved insecticide, containing a mixture of lead arsenate and hydrated sodium sulfate.

In testimony that I claim the foregoing I have hereunto set my hand.

FREDERIC J. SMITH.

Witnesses:
 HENRY J. MILLER,
 H. N. F. MILLER.